US010051834B2

(12) United States Patent
Schumski et al.

(10) Patent No.: US 10,051,834 B2
(45) Date of Patent: Aug. 21, 2018

(54) CEMENTITIOUS CLUMPING MATERIAL

(71) Applicant: The Andersons, Inc., Maumee, OH (US)

(72) Inventors: Joseph Schumski, Maumee, OH (US); Norman A. Peiffer, Maumee, OH (US)

(73) Assignee: The Andersons, Inc., Maumee, OH (US)

( * ) Notice: Subject to any disclaimer, the term of this patent is extended or adjusted under 35 U.S.C. 154(b) by 238 days.

(21) Appl. No.: 14/438,777

(22) PCT Filed: Oct. 25, 2013

(86) PCT No.: PCT/US2013/066923
§ 371 (c)(1),
(2) Date: Apr. 27, 2015

(87) PCT Pub. No.: WO2014/066823
PCT Pub. Date: May 1, 2014

(65) Prior Publication Data
US 2015/0296740 A1 Oct. 22, 2015

Related U.S. Application Data

(60) Provisional application No. 61/718,917, filed on Oct. 26, 2012.

(51) Int. Cl.
A01K 1/01 (2006.01)
A01K 1/015 (2006.01)

(52) U.S. Cl.
CPC .......... *A01K 1/0154* (2013.01); *A01K 1/0155* (2013.01)

(58) Field of Classification Search
None
See application file for complete search history.

(56) References Cited

U.S. PATENT DOCUMENTS

| 5,000,115 A | 3/1991 | Hughes |
| 5,188,064 A | 2/1993 | House |
| 5,458,091 A | 10/1995 | Pattengill et al. |
| 5,806,462 A * | 9/1998 | Parr ............. A01K 1/0155 119/171 |
| 5,970,916 A | 10/1999 | Yoder |
| 6,053,125 A | 4/2000 | Kory et al. |
| 7,419,544 B2 | 9/2008 | Naji et al. |
| 8,366,822 B2 | 2/2013 | Kim-Habermehl et al. |
| 2005/0005869 A1* | 1/2005 | Fritter ............. A01K 1/0152 119/173 |
| 2005/0160996 A1 | 7/2005 | Weaver |
| 2008/0022940 A1* | 1/2008 | Kirsch ............. A01K 1/0152 119/173 |
| 2009/0308323 A1* | 12/2009 | Van Nieuwenhuijzen-Van Rooijen ........ A01K 1/0154 119/173 |
| 2010/0137126 A1 | 6/2010 | Philipp |

FOREIGN PATENT DOCUMENTS

| EP | 0165820 A2 | 6/1985 | |
| GB | 2169484 A * | 7/1986 | .......... A01K 1/0154 |
| WO | 2010057124 A2 | 5/2010 | |

* cited by examiner

*Primary Examiner* — Joshua E Rodden
(74) *Attorney, Agent, or Firm* — Avery N. Goldstein; Blue Filament Law, PLLC

(57) ABSTRACT

A cementitious clumping material is provided and in particular to an animal litter formed therefrom. The cementitious clumping material includes a mixture of particulate, cement, and a cellulosic material. The cementitious clumping material in some embodiments contains a dust control agent, a polyol, or combinations thereof. The cementitious clumping material is pourable into a litter box and agglomerates into a clump upon contact with urine or other liquid forming a clump having a percentage of maximal strength greater than 95% upon clump formation, and having a clump strength of greater than greater than 250 kg/cm2. The clump is further capable of removal with a perforated scoop after as little as one minute of formation.

20 Claims, No Drawings

CEMENTITIOUS CLUMPING MATERIAL

RELATED APPLICATION

This application claims priority benefit of U.S. Provisional application Ser. No. 61/718,917 filed Oct. 26, 2012; the contents of which are hereby incorporated by reference.

FIELD OF THE INVENTION

The invention in general relates to cementitious clumping material and in particular to an animal litter formed therefrom.

BACKGROUND OF THE INVENTION

The production of animal litter from various mineral and biomass granular materials that are decorated with urine-activated clumping agents is well known to the art. Representative examples are found in U.S. Pat. Nos. 5,458,091 and 6,053,125. While such animal litter products have generally been effective, the generally modest urine absorption by a base granule has meant that urine entrainment has had to occur through the wetting and activation of the surface decorating clumping agent. This mechanism results in a less efficient use of litter than would otherwise be obtainable provided the base granule was urine absorbent.

Since conventional animal litters are formed from a large granule decorated with clumping agent, granule irregularity in both shape and size tends to create tracking of the resulting litter by an animal after usage in addition to dust formation associated with granule bumping during transport. A still further limitation of conventional animal litter products is that the typical granule size decorated with clumping agent forms a mass that is unsuitable for disposal in most septic systems and therefore must be handled as solid waste.

The ability to form a clump upon wetting that has sufficient strength remains a challenge on balance with the needs for limited dusting, material density, and price fluctuations associated with various conventional clumping agents such as guar gum. Clump strength upon hydration also presents considerable problems in the area of drilling fluids used for oil and other extraction processes. While these requirements have conventionally been addressed using clays, these results have met with limited success.

Many varieties of cement undergo a hydration reaction and bind water as part of the cure reaction. Cement has largely been discounted for uses such as a litter where clumping is desired owing to dust problems.

Thus, there exists a need for a cementitious material inclusive a clumping agent mixture that affords superior properties and has application as an animal litter.

SUMMARY OF THE INVENTION

A clumping material is provided that includes a hydration curing cement and particles inclusive of sand and metal that reacts with the cement to create an aerated concrete. A cellulosic material modified to include moieites of alkoxy or carboxy to impart water solubility to the cellulosic material is present to form the clumping material. The resulting material is particularly well suited as an animal litter and a drilling fluid for oil and gas extraction. In some inventive embodiments, an anhydrous polyol, a dust control agent, or combinations thereof are also present.

DETAILED DESCRIPTION OF THE PREFERRED EMBODIMENTS

The present invention has utility as a litter to absorb aqueous liquids such as animal urine and environmental spills, and is also operative as a drilling fluid operative in oil and natural gas extraction. By using a hydration curing cement in concert with a synergistic combination of a cellulosic material modified to include moieites of alkoxy or carboxy to impart water solubility to the cellulosic material, a material is formed that overcomes several limitations of conventional litters and has exceptional clump strength.

A cement operative in the present invention has the ability to cure in the presence of water. Cements operative herein illustratively include portland cements inclusive of those containing slag or fly ash; calcium aluminate; slag-lime; calcium sulfoaluminate; magnesium oxysulfate; pozzolan-lime; and combinations thereof. The cement is present in specific embodiments at varying levels from 0.1 to 100 total volume percent. However, in one embodiment of the present invention the cement is present from 5 to 95 total volume percent of the material in an uncured state.

An inventive material includes a particulate. The particles operative in the present in invention include those conventionally mixed with cement to form concrete of sand and gravel, as well as plant derived biodegradable polymers of hulls, stover, stalks and the like in embodiments that require an overall reduction in density. In those embodiments of the present invention particularly well suited as animal litters and drilling fluids, density of a material that is a majority by weight concrete with sand and gravel as the particles is often considered to be too dense for handling and in those embodiments the particles include polymeric particles such as expanded polystyrene and biodregradeable polymers in densified or expanded forms in partial or complete replacement of the sand; or metallic particles such as aluminum that react with cement components during cure to evolve hydrogen or other gases that become entrained in the cement to form aerated concrete; or both polymeric particles and metallic particles. It is appreciated that the metallic particles in some embodiments are pre-reacted to form an aerated concrete, synonymously referred to herein as autoclaved aerated concrete (AAC).

Particulates conventional to animal litters operative herein illustratively include corncob; bentonite; diatomaceous earth; attapulgite; montmorillonite; cellulosic plant stalks, husks, hulls, and sawdust; and combinations thereof; and mixtures of the aforementioned particles. Representative feedstocks for the formation of plant based particles in the present invention illustratively include corn cob; saw dust, plant stocks; grain hulls, nut hulls, husks such as coconut, psyllium, and corn; tree bark; fronds; straw; and combinations thereof. The size of the particles is largely immaterial to the function, but particles able to pass screen sizes between −6 and +400 are generally operative herein either as distinct monolithic particles or are agglomerated fines that collectively form a particle with resort to a binder or other conventional techniques. It should be appreciated that in animal litters, the particles in certain embodiments represent the majority by weight and volume of the litter with lower density plant based particles, gas evolving metals, and synthetic polymers well suited, either alone or in combination to produce a lower density and therefore easier to handle clumping material. The amount of particulate present should be appreciated to vary with the nature of particles with gas evolving metals being present in from 1 to 20 total volume percent, while other types of particles are present in specific embodiments from 1 to 93 total volume percent. It should be appreciated that gas evolving particles, inorganic particles, and plant based particles are readily used together in an inventive litter.

A concrete formed by the combination of a cement and a particulate alone tend to generate dust that is disfavored for usage as a litter owing to indoor air quality. Therefore, in some embodiments, a clumping agent is provided. An inventive material therefore includes a synergistically effective amount of a cement, a particulate and a cellulosic material modified to include moieites of alkoxy or carboxy to impart water solubility to the cellulosic material.

In one embodiment, an inventive material further includes a synergistically effective amount of an anhydrous polyol in combination with the cement, particulate, and the modified cellulosic material. Alkoxy and carboxy moieties such as those that are $C_1$-$C_6$ are well suited for use in the present invention. It is appreciated that cellulosic materials also readily include a portion of aliphatic derivation to include a degree of ethylation or methylation so long as the water solubility of the cellulosic material is overall increased through the inclusion of alkoxy moieites, carboxy moieties, or a combination thereof. Specific cellulosic materials operative in the present invention include carboxymethylcellulose, hydroxyethylcellulose, hydroxy-methylethylcellulose, hydroxyethylpropylcellulose, methylhydroxyethylcellulose, and a combination thereof. Sodium carboxymethylcellulose represents a common, low toxicity cellulosic material operative in the present invention. The cellulosic material is present in certain inventive embodiments at 1 to 10 total weight percent. The cellulosic material component is well suited for spray application to the large volume of cement and particles of an inventive cementitious material.

In one embodiment carboxymethylcellulose (CMC) and the Autoclaved Aerated Concrete (AAC) mixture have a surprising synergy revealing an improved result. Here, an effective amount of AAC, particulate, and CMC is mixed, where the mixture binds to the particles using a dust control agent or binder. A suitable dust control agent or binder can be any of the following: clays, paint rock, soda ash, limestone, lime, hydrated lime, iron sulfates, amines, amine carboxolates, animal proteins (e.g. dried blood), manures, cereal grains, flours, hulls, corn cobs, gelatins, glues, gums, humic acids, lignins, lignosulfonates, pulp, polyacroleins, polyacrylamides, polyamines, starch, sugar, surfactants, wood chips, wood flour, carboxymethylcellulose (CMC), molasses, corn syrup, graft copolymers of acrylic acid, possuolan, cement, tar, pitch, polyvinyl alcohols, dolomite, synthetic organic dispersants and high molecular weight substantially straight chain water-soluble polymers. In one embodiment, corn syrup or a lignosulfate is used as an acceptable binder for the CMC and AAC combination.

While the cellulosic material component of the present invention is commonly used as a component of an animal litter, In one embodiment it has been surprisingly found that it forms an exceptionally good clumping agent is formed through combination with an anhydrous polyol.

As used herein "anhydrous" is defined as having insufficient water content to induce cure to a clumped state of the cement. While this term is used most often to describe the polyol component, it should be understood that the clumping of the present invention is the result in part of a chemical reaction through hydration and that all of the inventive components should be sufficiently dry prior to usage to form an inventive material to preclude premature cure.

Specific polyols operative in the present invention illustratively include glycols, glycerol, and pentaerythritol, trimethylolethane, trimethylolpropane, 1,2,6-hexanetriol, sorbitol, inositol, and poly(vinyl alcohol). The polyol is typically used at less than 2% by weight water contant and is present in certain inventive embodiments at 1 to 10 total weight percent. The polyol material component is well suited for spray application to the large volume of cement and particles of an inventive cementitious material. In specific embodiments, the cellulosic material is present in a ratio relative to the polyol of between 0.2-5:1.

It is appreciated that in addition to the aforementioned components, various additives can be incorporated into a material according to the present invention. These additives illustratively include a colorant, a fragrance, an acid neutralizing agent, and a desiccant. When present, a colorant or fragrance is typically present from 1 ppm to 10 dry total weight percent. When present, an acid neutralizing agent is typically present from 0.05 to 10 dry total weight percent. When present, a desiccant is typically present from 0.05 to 10 dry total weight percent.

An inventive cementitious material typically formed by mixing the cement and particles together and then this mixture is then coated by the cellulosic material and polyol to serve as a synergistic clumping agent. Typically, the cellulosic material and polyol are added in a conventional fluidizing mixer; however, it is appreciated that there are a variety of conventional techniques by which cement and particles can be coated; such techniques illustratively include spray coating and dip coating.

In one embodiment, an inventive cementitious material is formed by mixing a cement and particulate together. The mixture is then coated by the cellulosic material. In one embodiment an additional binder, is used as a dust control agent to assist in coating the mixture with the cellulosic material to serve as a synergistic clumping agent.

It is appreciated that the clumping agent present at the lower ranges contemplated results in a more readily crumbled clump, whereas greater amounts of clumping agent tend towards rock-like clumps with a high degree of stability. A clumped litter according to the present invention upon exposed to a liquid typically represents between 80 and 99 total weight percent of an inventive cementitious material with the remainder being absorbed aqueous liquid.

The resultant inventive animal litter clump has a mechanical adhesion strength of typically greater than 250 $kg/cm^2$ and often between 300 $kg/cm^2$ and 450 $kg/cm^2$. Clump strength is readily measured by a procedure as detailed in US 2009/0308323, the contents of which are hereby incorporated by reference in total, with particular reference to [0071] and [0072]. The strength of a clump is also readily expressed as a percentage of the maximal strength as measured as a function of time.

The present invention is further detailed with respect to the following non-limiting examples. These examples are not intended to limit the scope of any claims directed to the present invention but rather to illustrate with specificity certain embodiments of the present invention and attributes thereof.

EXAMPLE 1

10 kilograms of Autoclaved Aerated Concrete (AAC), and 0.5 kilograms of Portland cement are intermixed to form a mixture. The mixture is mixed with a particulate and is coated with 2% sodium carboxymethylcellulose (CMC), with the percentages being total weight percentages. An additional binder, such as corn syrup, is used as a binding agent to aide with the coating of the cement/particulate mixture with the CMC. The fraction of coated cement and particles are exposed to 50 milliliters of pH 8 ammonia water to simulate urine. A clump is allowed to form at room temperature and measured as to strength. The results as a percentage of maximal strength observed are: 15 min=97%, 1 hr=96%, 24 hr=96%, 48 hr=98%. Clump strength at 100% is in excess of 250 kg/cm$^2$.

The process for determining clump strength as percent is as follows:

Equipment 8 inch diameter ¾ inch mesh screen 8 inch diameter screen pan

Balance capable of reading 0.1 grams

Container capable of holding litter to at least a 3 inch depth and up to 6 clumps (ex: plastic shoe box 7×9×4.5")

Syringe capable of delivering at least 25 mL (ex: a 60 mL syringe)

Slotted spoon, rounded (cat litter scoop)

2% NaCl solution (table salt w/de-ionized water) at room temperature

Procedure

1. Record the sample batch no./ID, test date, and sample comments/description on the Test Results Chart.

2. Weigh the screen and the pan (in grams).

3. Incorporate these weights into the Excel calculations for % Hardness on the Test Results Chart.

4. Place the screen on the pan and place these on a solid surface, such as a bench top.

5. Near the screen/pan and on a vertical wall or post, put a mark that is 12 inches above the screen mesh.

6. Pour the mixed litter material into a container (flat bottom plastic shoe box) to a depth of at least 3 inches.

7. Level the top surface of the cat litter by gently shaking and/or using a leveling tool. Avoid a slanted surface.

8. Load a 60 mL syringe with the salt solution to the 50 mL mark (to deliver two 25 m charges).

9. Hold the syringe steady, about one inch above the litter. Add 25 mL of the salt solution to one location trying to target a 3 sec delivery time. The liquid should not pool on top of the litter.

10. Add the salt solution to 2 more locations making sure clumps are not too close to each other.

11. For each clump, scoop out the clump after 15 minutes using the slotted spoon. Make sure to get under the clump and to not damage adjoining clumps.

12. Tap the scoop to get rid of most of the loose debris. Gently roll clump in hands to get rid of the rest of the loose debris.

13. Holding the clump with the hand, position it so it will drop on its side onto the middle of the screen. The drop is to be a 12 inch drop to the mesh (use the 12 inch mark).

14. Quickly release the clump without spinning it, allowing it to free fall 12 inches to the center of the screen.

15. Record the clump condition: H for hard; S for soft (but intact); C for cracked; CA for cracked apart; DC for decapitated (top part of lump fell off); and FA for fell apart into multiple pieces.

16. Place the pan, the screen, what is left of the clump, and the debris (in the pan) on the balance.

17. Record the weight (in grams to 0.1 g) as W1 on the Test Results Chart.

18. Remove the screen (with residual clump) from the pan (with debris) and weigh the screen (with residual clump) separately. Record this weight as W2 on the Test Results Chart.

19. Discard residual clump and debris. Clean the screen and the pan with the brush thoroughly.

20. Calculate an average Percent Hardness (% H) (see calculations below).

21. Repeat triplicate clump testing for times of 1 hour, 24, hours, and 48 hours.

Calculations

W1=weight of screen, pan, residual clump, and debris

W2=weight of screen and residual clump $$\%H = \% \text{ Hardness of the Clump} = (100\%) \times (W2-S)/(W1-S-P)$$

Where S=wt of Screen in grams

Where P=wt of Pan in grams

Comparative Examples A-F

The procedure detailed in Example 1 is repeated with the exception that the clumping agent is changed:

Comparative Example A glycerol is replaced with a pre-gelatinized potato starch (PS) and proved to be too dusty to proceed. Mineral oil is added to 2 total weight percent to control the dust. The resulting clumps are soft and fail during handling.

Comparative Example B 5 total weight percent CMC/1.25 total weight percent PS provides clumps that are too soft.

Comparative Example C 2 total weight percent CMC without glycerol affords dusty clumps with Clump Strengths: 15 min=72%, 1 hr=68%.

Comparative Example D 2.5 total weight percent glycerol provides clumps that are too soft.

Comparative Example E 2.5 total weight percent glycerol/0.6 total weight percent water-clump formation is premature.

Comparative Example F

The mixture is made as detailed in Example 1, however no additional binding agent is used, where the cellulosic material, CMC, acts as its own binding agent.

EXAMPLE 2

10 kilograms of Autoclaved Aerated Concrete (AAC) is coated with 2% sodium carboxymethylcellulose (CMC) and 2.5% glycerol (with less than 1 percent water content to glycerol), with the percentages being total weight percentages. The fraction of coated cement and particles are exposed to 50 milliliters of pH 8 ammonia water to simulate urine. A clump is allowed to form at room temperature and measured as to strength. The procedure detailed in Example 1 is repeated. The results as a percentage of maximal strength observed are: 15 min=97%, 1 hr=96%, 24 hr=96%, 48 hr=98%. Clump strength at 100% is in excess of 250 kg/cm$^2$.

EXAMPLE 3

The procedure detailed in Example 1 is repeated with the exception that the AAC is replaced with 10% by volume portland cement and 90% by volume corn cob particulate with a size range of −20 and +200 with like absorption and mechanical strengths noted for the resultant clump.

Numerical ranges cited herein are intended to recite not only the end values of such ranges but the individual values encompassed within the range and varying in single units of the last significant figure. By way of example, a range of from 0.1 to 1.0 in arbitrary units according to the present invention also encompasses 0.2, 0.3, 0.4, 0.5, 0.6, 0.7, 0.8, and 0.9; each independently as lower and upper bounding values for the range.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A clumping material comprising:
   a hydration curing cement comprising Portland cement curable in the presence of water;
   a plurality of particles, said hydration curing cement and said plurality of particles forming a mixture; and
   a cellulosic material modified to include moieties of alkoxy or carboxy to impart water solubility to said cellulosic material coating said mixture.

2. The material of claim 1 further comprising an anhydrous polyol.

3. The material of claim 2 wherein said anhydrous polyol is glycol, glycerol, pentaerythritol, trimethylolethane, trimethylolpropane, 1,2,6-hexanetriol, sorbitol, inositol, poly(vinyl alcohol), or a combination thereof.

4. The material of claim 3 wherein said polyol is glycerol.

5. The material of claim 2 wherein said polyol is present at 1 to 5 total weight percent.

6. The material of claim 2 wherein said cellulosic material is present in a ratio relative to said polyol of between 0.2-5:1.

7. The material of claim 1 further comprising a dust control agent.

8. The material of claim 7 wherein said dust control agent is one or more of: clay, paint rock, soda ash, limestone, lime, hydrated lime, iron sulfate, an amine carboxylate, animal protein, manure, cereal grain, flour, hull, corn cob, gelatin, glue, gum, humic acid, lignin, lignosulfonate, pulp, polyacrolein, polyacrylamide, polyamine, starch, sugar, surfactant, wood chips, wood flour, carboxymethylcellulose (CMC), molasses, corn syrup, graft copolymers of acrylic acid, possuolan, cement, tar, pitch, polyvinyl alcohols, dolomite, synthetic organic dispersants or water-soluble polymers with a molecular weight of greater than 500 Daltons.

9. The material of claim 8 wherein said dust control agent is corn syrup or a lignosulfonate.

10. The material of claim 1 wherein said cement contains at least one of slag, fly, ash, calcium aluminate, silicates, calcium salt slag-lime, calcium sulfoaluminate, magnesium oxysulfate, pozzolan-lime.

11. The material of claim 10 wherein said cement is a mixture of autoclaved aerated concrete (AAC) and said Portland cement.

12. The material of claim 1 wherein said plurality of particles includes at least one of corncob; bentonite; diatomaceous earth; attapulgite; montmorillonite; cellulosic plant stalks, husks and hulls; sand, plant based particles, metals that react with said cement to evolve hydrogen; and combinations thereof.

13. The material of claim 12 wherein said plurality of particles are metallic and react with said cement to evolve hydrogen.

14. The material of claim 13 wherein said plurality of particles are aluminum.

15. The material of claim 1 wherein said cellulosic material includes at least one of carboxymethylcellulose, hydroxyethylcellulose, hydroxy-methylethylcellulose, hydroxyethylpropylcellulose, or methylhydroxyethyl-cellulose.

16. The material of claim 15 wherein said cellulosic material is carboxymethylcellulose.

17. The material of claim 1 wherein said cellulosic material is present at 1 to 5 total weight percent.

18. The material of claim 1 wherein when said material is wetted with a liquid, the material forms a clump having a strength of greater than 250 kg/cm$^2$.

19. The material of claim 1 wherein when said material is wetted with a liquid, the material forms a clump having a percentage of maximal strength greater than 95% within one hour of said material being wetted.

20. A clumping material comprising:
   a hydration curing cement comprising Portland cement curable in the presence of water;
   a plurality of particles, said hydration curing cement and said plurality of particles forming a mixture, said plurality of particles comprising sand and metal that reacts with said hydration curing cement to create an aerated concrete;
   a cellulosic material modified to include moieties of alkoxy or carboxy to impart water solubility to said cellulosic material coating said mixture; and
   optionally including an anhydrous polyol, a dust control agent, or combinations thereof.

* * * * *